United States Patent [19]

Tahara et al.

[11] Patent Number: 4,849,809
[45] Date of Patent: Jul. 18, 1989

[54] CRT PRINTING APPARATUS FOR PRINTING A COMPOSITE IMAGE

[75] Inventors: Syuji Tahara; Kiichiro Sakamoto, both of Kanagawa; Yuji Oshikoshi; Kunio Takagi, both of Tokyo, all of Japan

[73] Assignee: Fuji Photo Film Co., Ltd., Kanagawa, Japan

[21] Appl. No.: 127,141

[22] Filed: Dec. 1, 1987

[30] Foreign Application Priority Data

Dec. 1, 1986 [JP] Japan .................................. 61-286302

[51] Int. Cl.$^4$ .............................................. H04N 1/46
[52] U.S. Cl. ......................................... 358/75; 355/20; 355/40
[58] Field of Search .................... 358/75, 244; 355/40, 355/39, 20; 354/105, 106, 109

[56] References Cited

U.S. PATENT DOCUMENTS

| | | | |
|---|---|---|---|
| 2,961,920 | 11/1960 | Sachtleben | 355/20 |
| 3,037,422 | 6/1962 | Haynes | 355/20 |
| 3,459,888 | 8/1969 | Sokolov | 355/20 X |
| 4,449,805 | 5/1984 | Sakurada et al. | 354/105 |
| 4,712,909 | 12/1987 | Oshikoshi | 354/109 X |
| 4,742,375 | 5/1988 | Kogane et al. | 355/20 |
| 4,764,807 | 8/1988 | Kimura et al. | 358/75 |
| 4,769,694 | 9/1988 | Oshikoshi | 358/75 |
| 4,786,944 | 11/1988 | Sakamoto et al. | 355/20 |

*Primary Examiner*—Howard W. Britton
*Assistant Examiner*—E. Anne Faris
*Attorney, Agent, or Firm*—Sughrue, Mion, Zinn, Macpeak & Seas

[57] ABSTRACT

A CRT printing apparatus for making a composite image print comprising a scene or human figure and graphics and/or letters, the apparatus including at least two exposure systems having black-and-white CRTs, one for exposing a photographic paper to a video image in the form of three black-and-white CRT images sequentially displayed in brightness patterns on the CRT. In each exposure system, the photographic paper is exposed to the black-and-white image through an appropriate mono-color filter. The two exposure systems are alternately activated to expose the color photographic paper.

11 Claims, 3 Drawing Sheets

CRT PRINTING APPARATUS FOR PRINTING A COMPOSITE IMAGE

BACKGROUND OF THE INVENTION

The present invention relates to a CRT printing apparatus for making a print, and more particularly but not exclusively to a CRT printing apparatus for printing a composite image on a photographic paper.

In recent years, it has become quite common to use various kinds of photographic prints with a season's greeting or complimentary phrase as postcards, greeting cards or the like. For making the prints, a CRT printing apparatus has been used which is adapted to display a scene and a season's complimentary phrase on its color CRT screen as a composite image to which a photographic paper is exposed. The composite image is prepared by computerized image processing of an image from an image input device such as a color TV camera, and a season's complimentary phrase is provided as a graphic image. For this image processing, the images are treated as video signals and processed with the aid of a computer.

The above-described color printer utilizing a color CRT is quite easy to use in such a printing operation. However, because of the low resolution of a color CRT in comparison with photographic films, color prints made by the color printer with a CRT are behind those made from conventional photographic film images in image quality.

It is, therefore, an object of the present invention to provide a CRT printing apparatus for making a print of a composite image with a good image quality and a simple operation.

SUMMARY OF THE INVENTION

To achieve the above and other objects and advantages of the present invention, the CRT printing apparatus comprises first and second exposure systems, each including a black-and-white CRT, for exposing a color photographic paper to CRT images displayed on screens of the black-and-white CRTs through color filters, e.g., red, green and blue filters, and means for alternately activating the first and second exposure systems so as to successively print the CRT images as a composite image on the color photographic paper. Three black-and-white images are sequentially displayed on the black-and-white CRTs in the form of a brightness pattern and are colored to corresponding monochromatic images through the respective filters. Each exposure system includes a printing lens for printing a reduced image on the color photographic paper. Due to the reduction of the image, the printed image has a high density of picture elements.

According to a feature of a preferred embodiment of the present invention, the black-and-white CRTs are arranged substantially at a right angle with respect to one another and the activating means includes a reflection mirror for alternately directing the CRT images onto the color photographic paper.

According to a feature of another preferred embodiment of the present invention, the black-and-white CRTs are arranged side-by-side and the activating means includes respective shutters for each black-and-white CRT.

BRIEF DESCRIPTION OF THE DRAWINGS

The invention will be more clearly understood from the following description taken in conjunction with the accompanying drawings, in which.

DETAILED DESCRIPTION OF THE INVENTION

Figure 1:
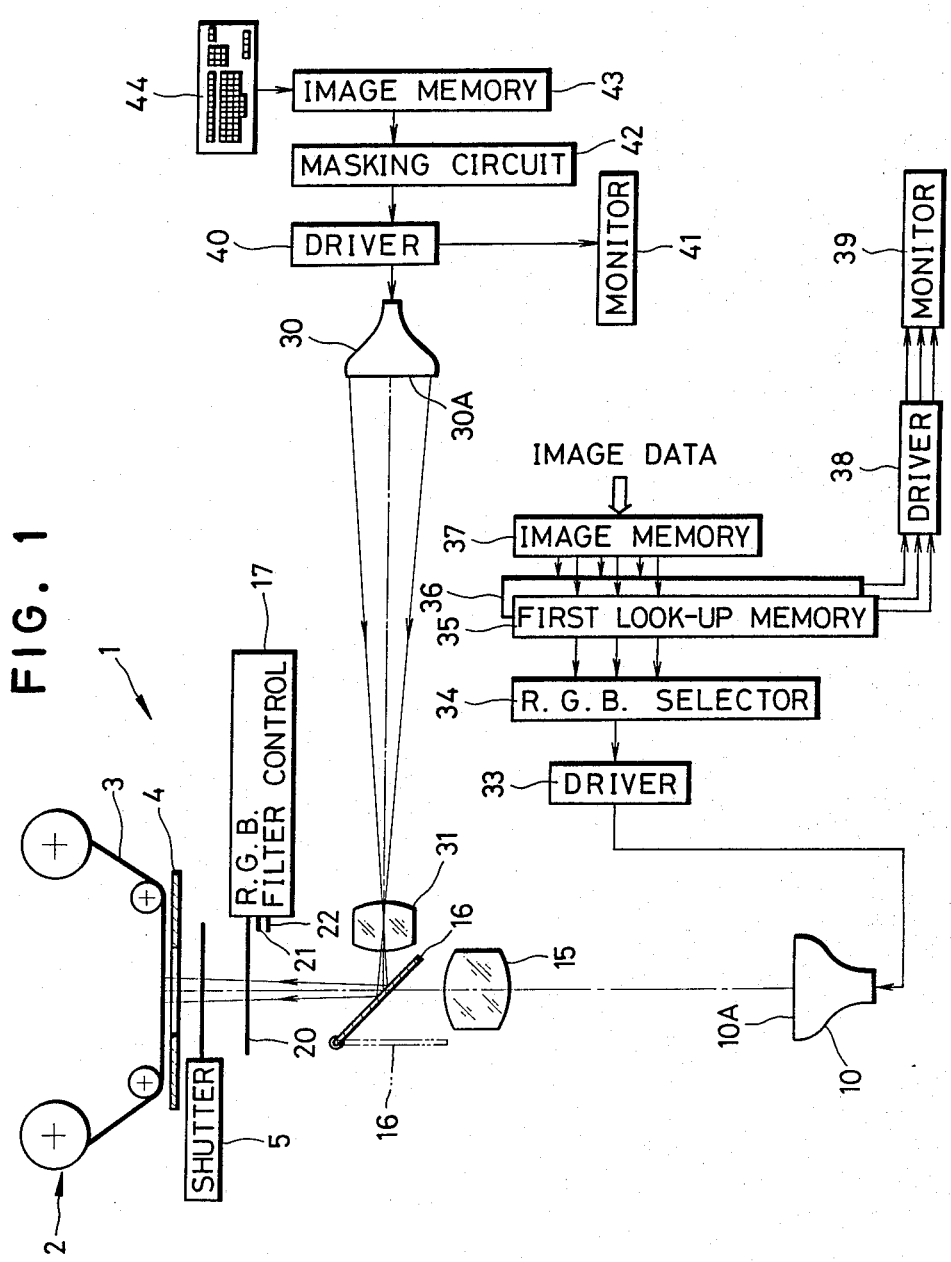
FIG. 1 is an explanatory illustration of a CRT printing apparatus embodying the present invention.

Before the description of the present invention proceeds, it is to be noted that same or similar parts are designated by the same reference numerals throughout the views of the accompanying drawings.

Referring now to the drawings and, in particular, to FIG. 1, there is shown a specific embodiment of the CRT printing apparatus according to the present invention which is used to make a composite image print from two CRT images. The CRT printing apparatus 1 has two, i.e., first and second, black-and-white CRT image projecting systems each including a black-and-white CRT display device (which is hereinafter referred to as a CRT for simplicity) 10, 30. The first CRT 10 is disposed opposite a color photographic paper 3 relative to a printing lens 15 and the second CRT 30 is located at a right angle with respect to the first CRT 10. The first CRT 10 displays on its screen 10A an image, e.g., a color video image, to be compositely printed. The image displayed on the screen 10A will hereinafter be referred to as a CRT image.

The CRT 10 sequentially displays black-and-white images on the screen 10A in the form of a brightness pattern for three monochromatic images, i.e., blue, green and red images. The color photographic paper 3 is exposed sequentially to the monochromatic images on the screen 10A of the CRT 10 through the printing lens 15 when a shutter 5 is opened. During this exposure, three primary color filters 20 to 22, i.e., red, green and blue filters, are selectively and sequentially inserted between the printing lens 15 and the shutter 5 under the control of a filter control device 17 so as to create mono-color CRT images to which the color photographic paper 3 is actually exposed in sequence. In this manner, the color photographic paper 10 is sequentially exposed to red, green and blue images, in that order.

The color photographic paper 3 is withdrawn from a film roll 2 by one frame of every set of exposures corresponding to one image, to be placed in an exposure position defined by an exposure mask 4 in a well known manner.

Located at a right angle with respect to the first CRT 10 is the second CRT 30 for displaying on its screen 30A an image, e.g., letters and/or a simple graphic image, to be compositely printed with the video image from the CRT 10. This CRT 30 also displays three black-and-white images in sequence in the same manner as the CRT 10, and the color photographic paper 3 is exposed to these images through the printing lens 31. However, in this case, the image on the CRT 30 is turned at a right angle by means of a reflection mirror 16 movably disposed between the printing lens 15 and the shutter 5.

Although it is preferable to use a well-known zoom lens for the printing lenses 15 and 31, it is permissible to use for each of these plurality of printing lenses having different focal lengths which are selectively disposed between the first CRT 10 and the shutter 5, or between the second CRT and the shutter 5, in a manner which is also well known.

A TV camera well known in the art per se can be used as an image input device to enter electrical signals corresponding to an image to be displayed on the screen 10A of the first CRT 10. The color TV camera (not shown) can pick up the image in a three color separation system and provides analog signals of the red, green and blue images to an image memory 37. The image signals of each mono-color image are transmitted to first and second video look-up tables 35 and 36. The image signals are subjected to positive-to-negative conversion after gradation correction in the first look-up table 35 and are subjected to gradation correction in the second look-up table 36. The image signals are, on one hand, transmitted to a monitor device 39 such as a color CRT through a driver circuit 38 to be displayed as a color image and, on the other hand, to a color selector, i.e., RGB selector 34, which selects a desired mono-color image signal and transmits the selected mono-color image signal to a driver circuit 33 to display the selected mono-color image signal on the screen 10A for the first CRT 10 as a black-and-white image in the form of a brightness pattern.

A keyboard 44 is provided as a data entry means for entering letter or other character data to be displayed on the screen 30A of the second CRT 30, and the entered data is stored in an image memory 43. The letter data is occasionally transmitted to a driver circuit 40 after having been subjected to masking processing by a masking circuit 42, to display the letter data as a black-and-white image on the screen 30A of the CRT 30, while also displaying the data on a monitor 41.

Figure 2:
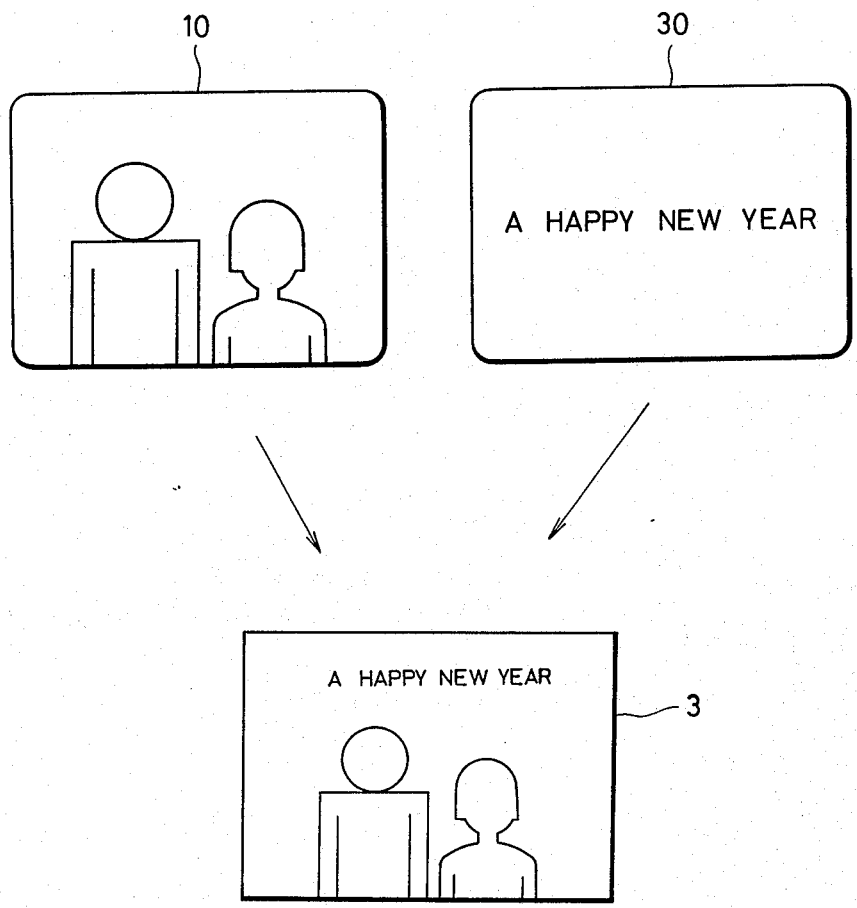
FIG. 2 is an illustration showing a process of making a composite image.

A process of making prints with the apparatus of the present invention will now be described with reference to FIGS. 1 and 2.

Images picked up by the color TV camera have been stored as image data in the form of color video signals for red, green and blue in the image memory 37. The image data of a desired image to be printed is first retrieved from the image memory 37 and transmitted to the first and second look-up tables 35 and 36. In the first look-up table 35 the image data is corrected in gradation and then converted from positive to negative color image data. The image signals for the respective colors are selected by color by the RGB selector 34 to be transmitted in sequence through the driver 33 to be displayed on the screen 10A of the CRT 10 as black-and-white images. Simultaneously with this sequential display, the color filters 20 to 22 are correspondingly sequentially actuated by the filter controller 17 to be inserted between the shutter 5 and the CRT 10. The color photographic paper 3 is exposed to the respective black-and-white images on the screen 10A of the CRT 10 by opening the shutter 5 for a suitable preselected time.

For example, the RGB selector 34 first selects red color signals after they have been subjected to positive-to-negative conversion and transmits them to the driver 33, to thereby display the red signals as a black-and-white image in the form of a brightness pattern on the screen 10A of the CRT 10. At this time, image signals subjected to gradation correction in the second look-up memory 36 are transmitted to the monitor 39 through the driver 38 to display a color image on the monitor 39. By observing the color image on the monitor 39, the CRT 10 can be manually adjusted to control the density of the black-and-white image on the screen 10A of the CRT 10.

During display of the black-and-white image corresponding to the red image on the screen 10A of the CRT 10, the red filter 20 is placed in the printing path under the control of the filter control 17, so that the black-and-white image is colored red. Thereafter, the shutter 5 is opened for a preselected time according to the red light sensitivity of the photographic paper 3, to expose the photographic paper 3 to the red colored image. As is well known in the art, this latent image of red is colored cyan when developed.

After exposure to the red colored image, the shutter is closed and the red filter 20 is replaced with the green filter 21. The same operation sequence is repeated for green and blue to complete a three color frame sequence exposure.

After exposure of the photographic paper by the first black-and-white CRT projecting system, another exposure is effected on the same frame where an exposure has been made by the first black-and-white CRT exposure system. For this subsequent exposure, the reflection mirror 16 is placed in the printing path to enable the second black-and-white CRT exposure system to expose the photographic paper 3 to the image displayed on the screen 30A of the CRT 30.

By using the keyboard 44, data for desired letters, e.g., a greeting message "A HAPPY NEW YEAR", can be previously entered into the image memory 43 and stored therein. Upon printing, this letter data is retrieved from the image memory 43 and transmitted to the masking circuit 42. As is well known the art, the data is electrically processed to provide signals suitably processed to display a desired form of an image of the letters. After this masking processing, the signals are transmitted to the CRT 30 to display an image of the letters, such as a greeting "A HAPPY NEW YEAR", on the screen 30A of the CRT 30 through the driver 40. Simultaneously, the signals are transmitted to the monitor 41 to display thereon the same image as that on the CRT 30. When observing the image on the monitor 41, the zoom lens 31 is operated to decrease the size of the image to be printed. It is preferred to reduce the image size as small as possible so as to increase the density of picture elements and to provide a well-balanced composition.

Each color filter is controlled to be placed in the printing path so as to print a desired color of the image of a letter on the photographic paper 3. For example, if it is desired to print a red letter, the photographic paper 3 is first exposed through the green color filter 21 by opening the shutter 5 for a time preselected according to the green light sensitivity of the photographic paper. Thereafter, the photographic paper 3 is exposed through the blue color filter 22 by opening the shutter 5 for a time preselected according to the blue light sensitivity of the photographic paper 3. As is well known in the art, the latent images formed through the green and blue color filters are colored magenta and yellow, respectively, so as to provide a red colored letter image when printed. In such a way, a composite image can be printed as is shown in FIG. 2.

Figure 3:
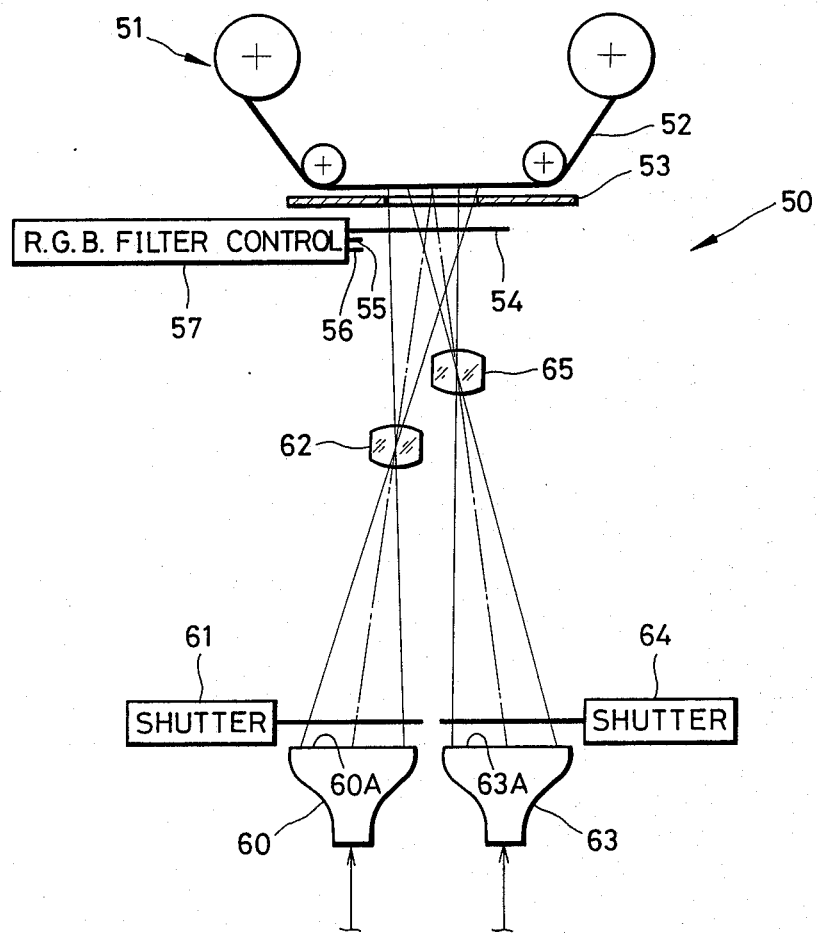
FIG. 3 is an explanatory illustration similar to FIG. 1 but showing another preferred embodiment of the CRT printing apparatus of the present invention.

Referring now to FIG. 3, shown therein is another embodiment of the present invention wherein first and second black-and-white CRT exposure systems are arranged side-by-side. The CRT printing apparatus generally designated at 50 is provided with a paper feeding mechanism 51, an exposure mask 53, and color filters 54 to 56 with associated filter controller 57 all of which are the same in function and construction as those in the previously described CRT printing apparatus of FIG. 1. However, first and second black-and-white CRTs 60 and 63 are disposed side-by-side below the exposure mask 53 and are provided with respective shutters 61 and 64. Between the CRTs 60 and 63 and the photographic paper 52 there are respective printing lenses 62 and 65. Each printing lens may be a zoom lens of the type having a shift and/or swing function. By using such a shiftable zoom lens for each printing lens, an image can be reduced and focused without distortion on the photographic paper 52.

According to the CRT printing apparatus 50 shown in FIG. 3, the first CRT 60 sequentially displays three monochromatic images on its screen 60A to which the photographic paper 52 is exposed in the same way as described for the first CRT 10 in the previous embodiment. Then the second CRT 63 displays an image of letters on its screen 63A to which the photographic paper 52 is overlappingly exposed in the same way as described for the second CRT 30 in the previous embodiment.

In the above-described preferred embodiment of the present invention, it is desirable to move any one of the photographic paper, printing lens, and the second CRT in order to form a graphic or letter image at a desired location on the photographic paper. This movement may be effected in any way known manner.

Although the present invention has been fully described by way of the preferred embodiments thereof with reference to the accompanying drawings, it is to be noted that various changes and modifications may be made to the disclosed embodiments without departing from the scope of the invention as defined in the appended claims.

What is claimed is:

1. An apparatus for printing a composite image on a color photographic paper in an exposure station, said apparatus comprising:
   first and second exposure means, each including a CRT display device having a screen, for exposing said color photographic paper to CRT images displayed on screens of said CRT display devices; and
   means for alternately activating said first and second exposure means while said photographic paper remains in said exposure station, wherein said activating means includes printing path changeover means for changing a printing path between said first and second exposure means, said changeover means includes means removably disposed between said exposure station and one of said CRTs, so as to successively print said CRT images as a composite image on said color photographic paper.

2. An apparatus as defined in claim 1, wherein each said CRT display device is a black-and-white CRT for displaying a black-and-white image.

3. An apparatus as defined in claim 2, wherein one of said black-and-white CRT display devices sequentially displays three black-and-white images in brightness patterns corresponding to three respective monochromatic images of different colors of an image to be printed.

4. An apparatus as defined in claim 3, wherein said activating means includes three monochromatic filters for converting said black-and-white images into three respective corresponding monochromatic images according to said displayed brightness patterns.

5. An apparatus as defined in claim 1, wherein said printing path changeover means includes a reflection mirror removably disposed between said exposure station and one of said CRTs.

6. An apparatus as defined in claim 1, wherein said printing path changeover means includes respective shutters for each CRT.

7. An apparatus as defined in claim 1, wherein one of said first and second exposure means displays a video image and the other a graphic image.

8. An apparatus for printing a composite image on a color photographic paper in an exposure station, said apparatus comprising:
   a first black-and-white CRT display device for sequentially displaying three black-and-white images of a video image in a brightness pattern;
   a second black-and-white CRT display device disposed substantially at a right angle with respect to said first black-and-white CRT display device for displaying a graphic image;
   monochromatic filters disposed between said exposure station and at least one of said first and second black-and-white CRT display devices for converting each said black-and-white image into a monochromatic image;
   exposure activating means for alternately exposing said photographic paper to said first and second black-and-white CRT display devices while said photographic paper remains in said exposure station so as to successively print the images on said first and second CRT display devices as a composite image on said photographic paper.

9. An apparatus as defined in claim 8, wherein said exposure activating means includes a shutter and a mirror removably disposed in an optical path between said exposure station and said one of first and second black-and-white CRT display devices.

10. An apparatus for printing a composite image on a photographic paper in an exposure station, said apparatus comprising:
    a first black-and-white CRT display device for displaying three black-and-white CRT images of a video image in a brightness pattern;
    a second black-and-white CRT display device disposed side-by-side with said first black-and-white CRT display device for displaying a black-and-white CRT graphic image;
    monochromatic filters disposed between said first and second black-and-white CRT display devices and said exposure station for converting each of said black-and-white CRT images into a respective monochromatic image; and
    a respective shutter disposed in an optical path between each of said first and second black-and-white CRT display devices and said exposure station for alternately exposing said photographic paper to said first and second black-and-white CRT display devices while said photographic paper remains in said exposure station so as to successively print said black-and-white CRT images as a composite image on said photographic paper.

11. An apparatus as defined in claim 10, wherein said monochromatic filters comprises a single set of filters disposed in the optical paths between said exposure station and each of said first and second CRT display devices.

* * * * *